(12) United States Patent
Swerdlow

(10) Patent No.: US 12,537,704 B2
(45) Date of Patent: Jan. 27, 2026

(54) CONTENT-BASED CONFERENCE NOTIFICATIONS

(71) Applicant: Zoom Communications, Inc., San Jose, CA (US)

(72) Inventor: Nick Swerdlow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/513,226

(22) Filed: Oct. 28, 2021

(65) Prior Publication Data

US 2023/0137043 A1    May 4, 2023

(51) Int. Cl.
*H04L 12/18* (2006.01)
*G10L 15/26* (2006.01)
*G10L 17/00* (2013.01)
*H04M 3/56* (2006.01)

(52) U.S. Cl.
CPC .......... *H04L 12/1822* (2013.01); *G10L 15/26* (2013.01); *G10L 17/00* (2013.01); *H04M 3/563* (2013.01)

(58) Field of Classification Search
CPC ..... H04L 12/1822; G10L 15/26; G10L 17/00; H04M 3/563
See application file for complete search history.

(56) References Cited

U.S. PATENT DOCUMENTS

| | | | | |
|---|---|---|---|---|
| 7,412,392 B1 * | 8/2008 | Satapathy | ........... | H04L 12/1831 704/270.1 |
| 9,652,113 B1 * | 5/2017 | Colson | ................ | G06Q 10/1095 |
| 9,734,208 B1 * | 8/2017 | Goldstein | ......... | G06F 16/24578 |
| 10,686,939 B1 * | 6/2020 | Narayanaswamy | .. | H04M 3/561 |
| 2009/0048845 A1 * | 2/2009 | Burckart | ................ | G10L 15/26 709/206 |
| 2009/0187833 A1 | 7/2009 | Cheng et al. | | |
| 2010/0251177 A1 * | 9/2010 | Geppert | ................ | H04M 3/563 709/206 |
| 2010/0268534 A1 * | 10/2010 | Kishan Thambiratnam | ................ | G10L 15/07 704/235 |

(Continued)

OTHER PUBLICATIONS

Virtual Water Cooler for Remote Teams in 2021, Remote Working Made Fun, https://unremot.com/blog/virtual-water-cooler-for-remote-teams/, Admin, Feb. 28, 2021, 20 pages.

(Continued)

*Primary Examiner* — Brian J. Gillis
*Assistant Examiner* — Juan C Turriate Gastulo
(74) *Attorney, Agent, or Firm* — Young Basile Hanlon & MacFarlane, P.C.

(57) ABSTRACT

Identifying users who may be interested in content of a conference while the conference is ongoing includes generating a real-time transcript of a portion of the ongoing conference. The real-time transcript may be generated using a transcription engine accessing audio of an ongoing conference implemented by a conferencing software. Responsive to detecting that a topic-of-interest associated with a user who is not a current participant of the ongoing conference is referenced within the real-time transcript, a notification indicative of the topic-of-interest and the ongoing conference may be transmitted to a device associated with the user.

20 Claims, 9 Drawing Sheets

(56) References Cited

U.S. PATENT DOCUMENTS

| | | | | |
|---|---|---|---|---|
| 2013/0035114 | A1* | 2/2013 | Holden | H04W 4/025 |
| | | | | 455/456.3 |
| 2015/0067044 | A1* | 3/2015 | Bakaev | H04L 65/1059 |
| | | | | 709/204 |
| 2015/0312176 | A1* | 10/2015 | Jones | H04L 67/10 |
| | | | | 709/206 |
| 2018/0285820 | A1* | 10/2018 | Vendrow | G06Q 10/109 |
| 2019/0268387 | A1* | 8/2019 | Pelton | G06Q 10/10 |
| 2019/0304229 | A1* | 10/2019 | DeLeon | G06Q 50/01 |
| 2020/0401466 | A1* | 12/2020 | Frost | G10L 15/1822 |
| 2020/0403816 | A1* | 12/2020 | Daredia | G06V 40/164 |
| 2020/0412564 | A1* | 12/2020 | Roedel | H04L 12/1895 |
| 2021/0110154 | A1* | 4/2021 | Beller | G06F 16/328 |
| 2021/0160242 | A1* | 5/2021 | McKnight | H04L 63/102 |
| 2022/0261760 | A1* | 8/2022 | Cupala | G06Q 10/1095 |
| 2022/0382907 | A1* | 12/2022 | Siohan | G06F 21/6254 |
| 2023/0116052 | A1* | 4/2023 | Eskimez | G10L 21/0208 |
| | | | | 704/223 |

OTHER PUBLICATIONS

How to Stay Engaged IRL When Your Office is WFH, https://www.sococo.com/employee-engagement-remote-work/, Oct. 28, 2021, 8 pages.

How to enable Virtual Water Cooler Chats with Microsoft Teams, https://www.linkedin.com/pulse/how-enable-virtual-water-cooler-chats-microsoft-teams-bernd-lachner/, Bernd Lachner, Apr. 23, 2020, 6 pages.

Here's a Virtual Water Cooler to Gather Around With Your Team, ural Blog, https://www.mural.co/blog/virtual-office-water-cooler/, Oct. 12, 2021, 11 pages.

* cited by examiner

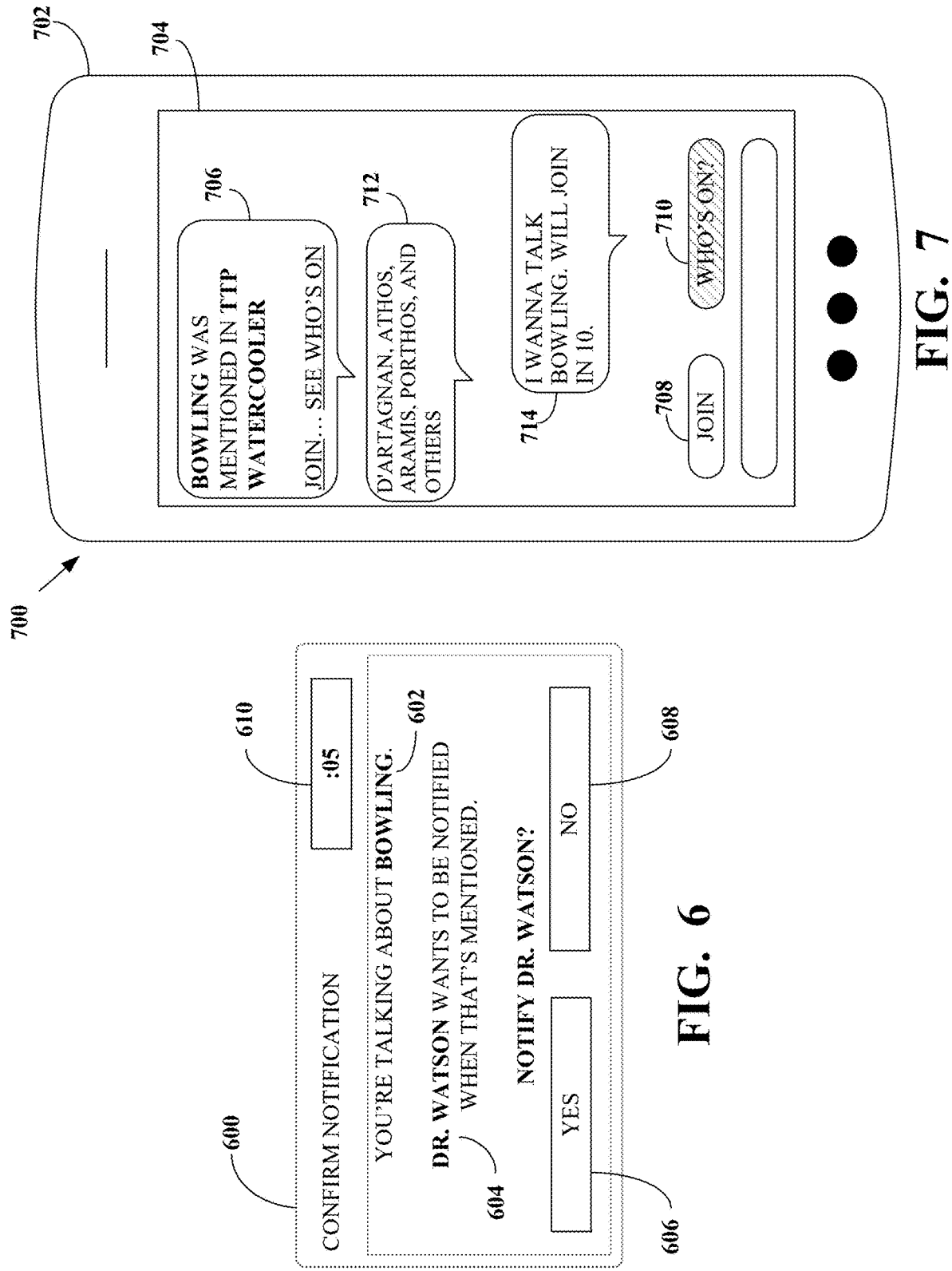

CONTENT-BASED CONFERENCE NOTIFICATIONS

FIELD

The present disclosure relates generally to communication management and, more specifically, to content-based conference notifications.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is an example of a prompt requesting confirmation to transmit a notification to an identified user.

FIG. 7 is an example of a notification received by an identified user in a text messaging application.

DETAILED DESCRIPTION

Figure 1:
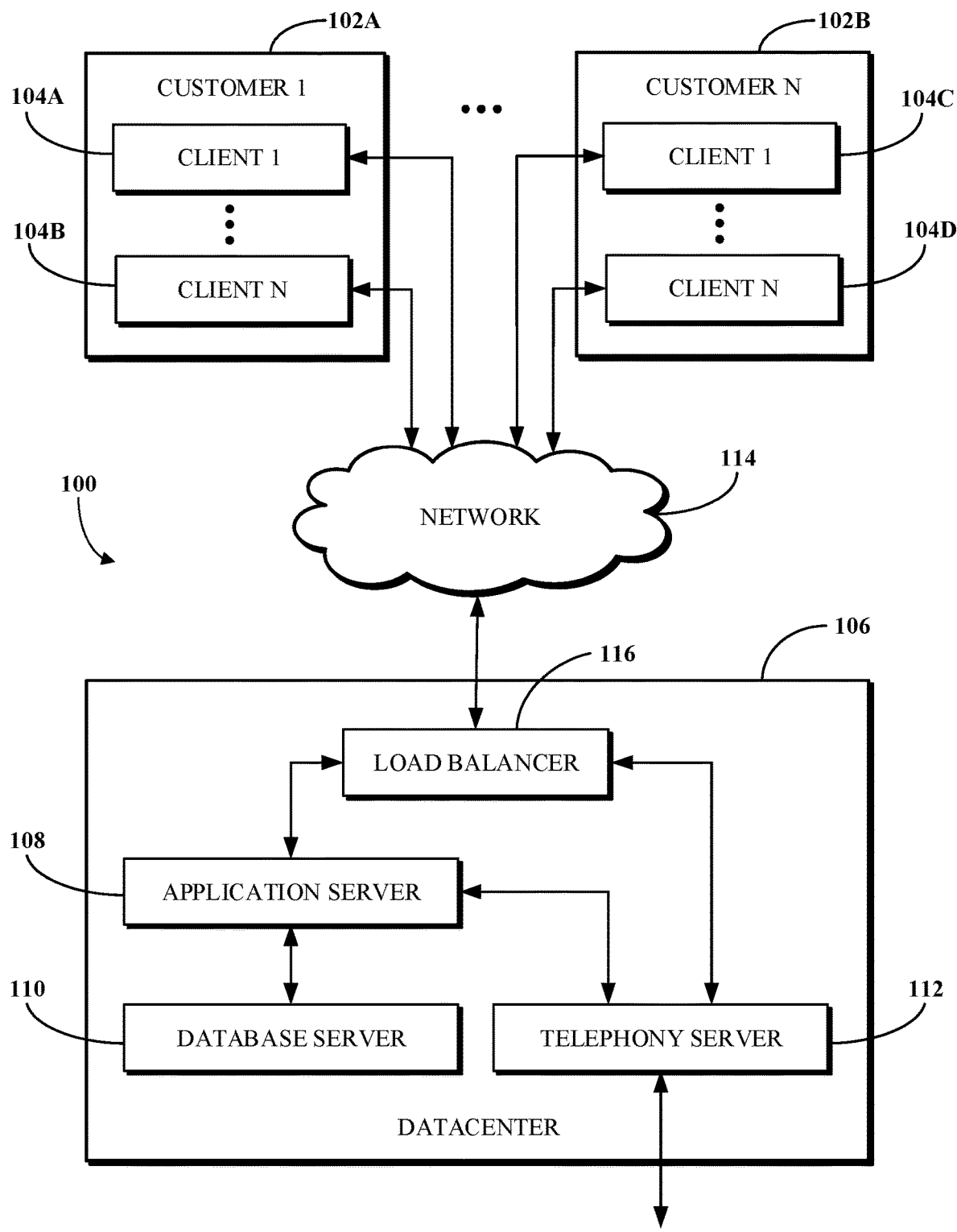
FIG. 1 is a block diagram of an example of an electronic computing and communications system.

People rely upon open channels of communication, whether virtual or physical, to converse with one another. For example, before remote work became popular or possible, many workers at an office setting would congregate in one spot or another in the office, such as at a watercooler area or a break room, to socialize and discuss work and non-work related matters. Others walking by or approaching the area may overhear the conversation and, if relevant to them, choose to join in.

Although conventional communication software services enable greater connectivity between people than ever before in human history, such conventional communication software services are limited in their ability to facilitate ongoing virtual congregation (e.g., socialization) opportunities such as, for example, around a virtual watercooler in an office setting. Using conventional communication software services, impromptu (e.g., ad-hoc) conferences may be scheduled. However, the organizer must set up the impromptu conference and specifically designates (e.g., invites) the participants who are to join the impromptu conference. In another example, a standing conference may be scheduled for a certain recurring timeslot and anyone with conference access information (e.g., a link to join) the conference may be able to join an ongoing instance of the standing conference.

Users who are not participants in a conference may in some cases be informed of the conversation thereat after the fact. For example, when a conference is terminated, a transcript of the conference may be generated and sent to the conference invitees (including participants and non-participants). The invitees and others to whom the transcript was forwarded may thus be informed of what was discussed based on the transcript. In particular, a participant or a forwardee may determine based on the transcript when certain events occurred during the conference (e.g., the forwardee is mentioned or a topic-of-interest (TOI) to the forwardee is discussed).

Conventional communication software services may be limited to providing services (e.g., tools) that enable participants who are already in a conference to communicate (such as via voice communication, video communication, chat communication, whiteboard tools, and the like). Conventional communication software services are, at best, passive observers of ongoing conferences. For example, they can be configured to record the ongoing conferences; however, they lack the technical capabilities to identify users who may be able to enrich the discussion, have an interest in a topic of discussion, have expertise that is relevant to the discussion, can immediately answer pending questions, and the like. As such, conventional communication software services do not effectively facilitate the identification of participants due to technical limitations of the software.

Implementations of this disclosure address problems such as these by identifying events occurring during an ongoing conference, identifying users based on the events, and notifying the identified users of the events. An identified user (e.g., an interested user) is a user who is not a current participant of an ongoing conference and is to receive notifications regarding certain events occurring at the conference. Based on an event occurring at an ongoing conference, and based on a received notification, the identified user may join the conference. For example, the event may relate to a conversation regarding a TOI for the identified user. The identified user may receive a notification indicating that the TOI is being discussed over the ongoing conference and choose to join the conference based on that notification, such as to participate in the discussion regarding the TOI.

Additionally, a conference of conventional communication software services may be configured to start and end at specified times. At the end time of an ongoing conference participants either leave or are removed therefrom as the resources used to facilitate the conference are otherwise unavailable for other use. To facilitate ad-hoc communications by users, and to overcome the technical resource limitations of conventional software, conferences configured according to this disclosure can be always-on or can alternatively be started when a first user indicates an intent to join such a conference.

A conference, as described herein, can be an audio-based conference, a video-based conference, a chat room, or another type of virtual space where multiple participants may be virtually assembled and at least some of the communication exchanged by the participants during the conference over one or more modalities may be transcribed (e.g., is text or is converted to text) and analyzed in real-time (i.e., while the conference is ongoing) to identify other users who should be notified of events occurring during the conference.

A "user" as used herein refers to a digital identification of a person that the person uses to identify himself or herself to, and interact with, a software platform, such as those described herein. To transmit a notification to the person, the software platform can transmit the notification to the user, which the person can receive at a device (i.e., a user device) associated with the person.

Some of the features described herein rely on recording and temporarily storing of conference content. Such features are provided on an opt-in basis. Participants of conferences configured to notify users as described herein are warned that their content may be recorded. If any one participant of a conference indicates that no notifications are to be sent based on the content of the conference, then no portion of the content is used to obtain transcripts or to respond to commands.

To describe some implementations in greater detail, reference is first made to examples of hardware and software structures used to implement content-based conference notifications. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
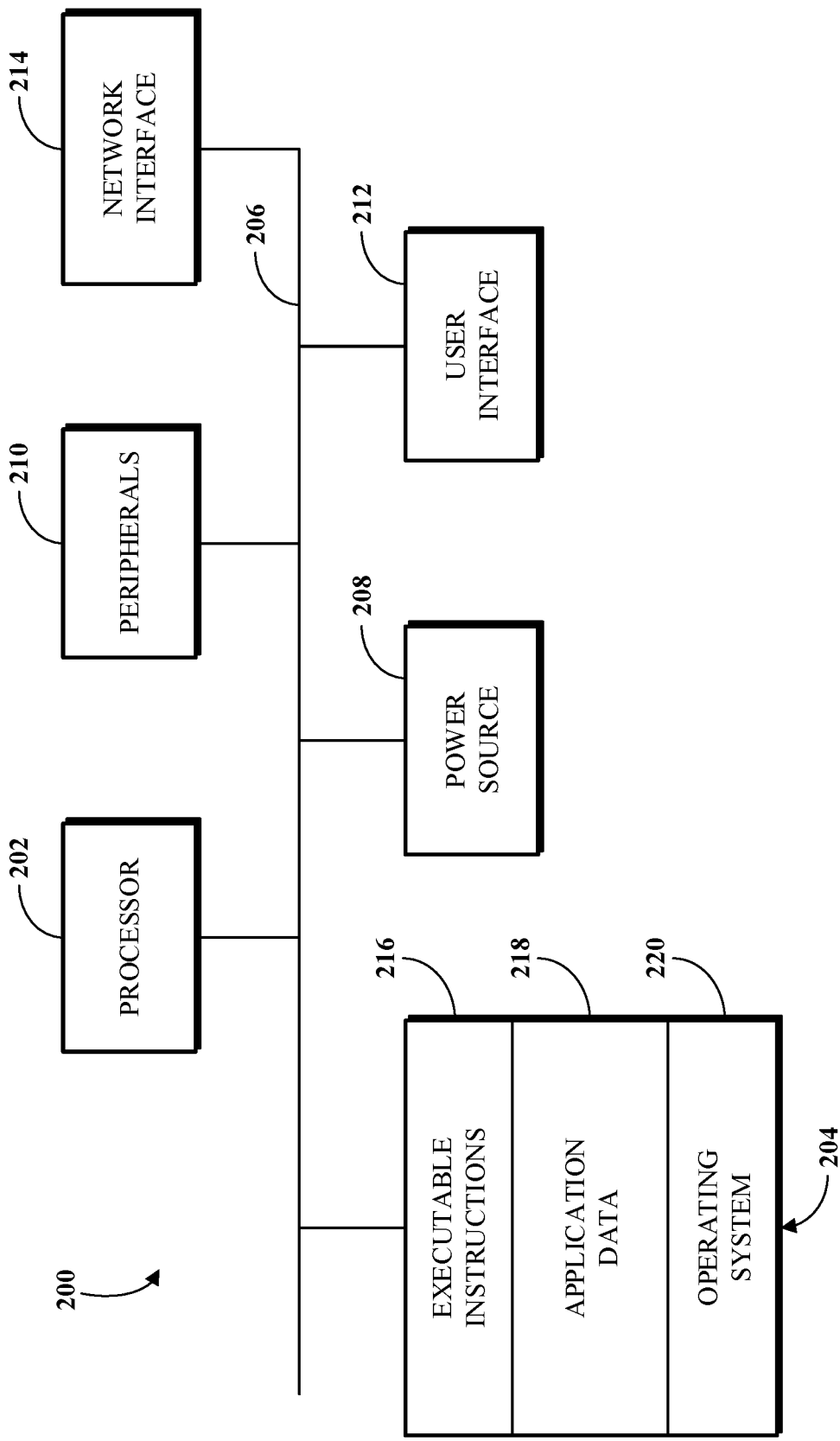
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 1002.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
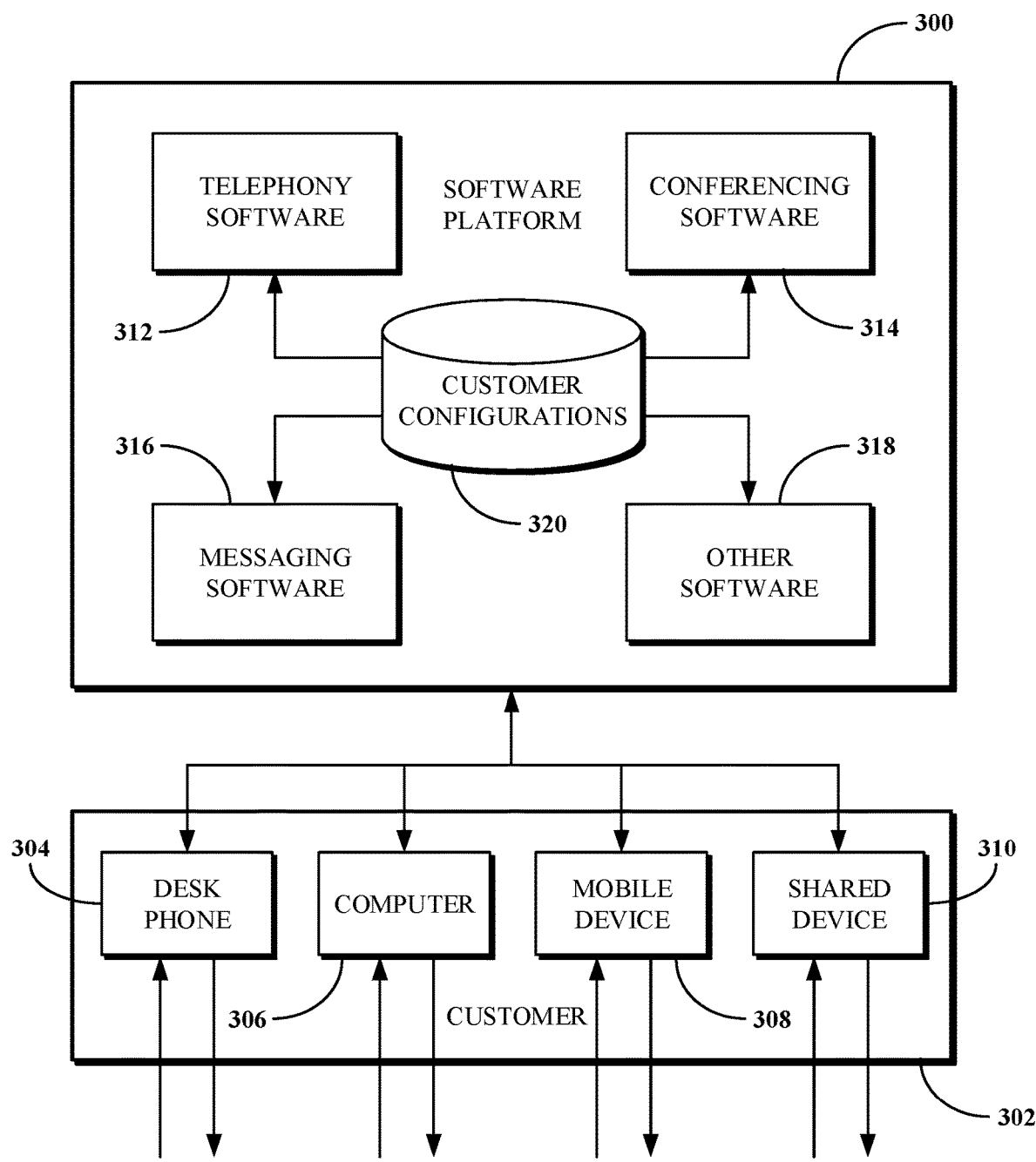
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include collaboration enabling software for identifying users to notify regarding conversational content of a conference based on a real-time analysis of a transcript of the conference and for sending notifications indicating the content to devices associated with the identified users.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
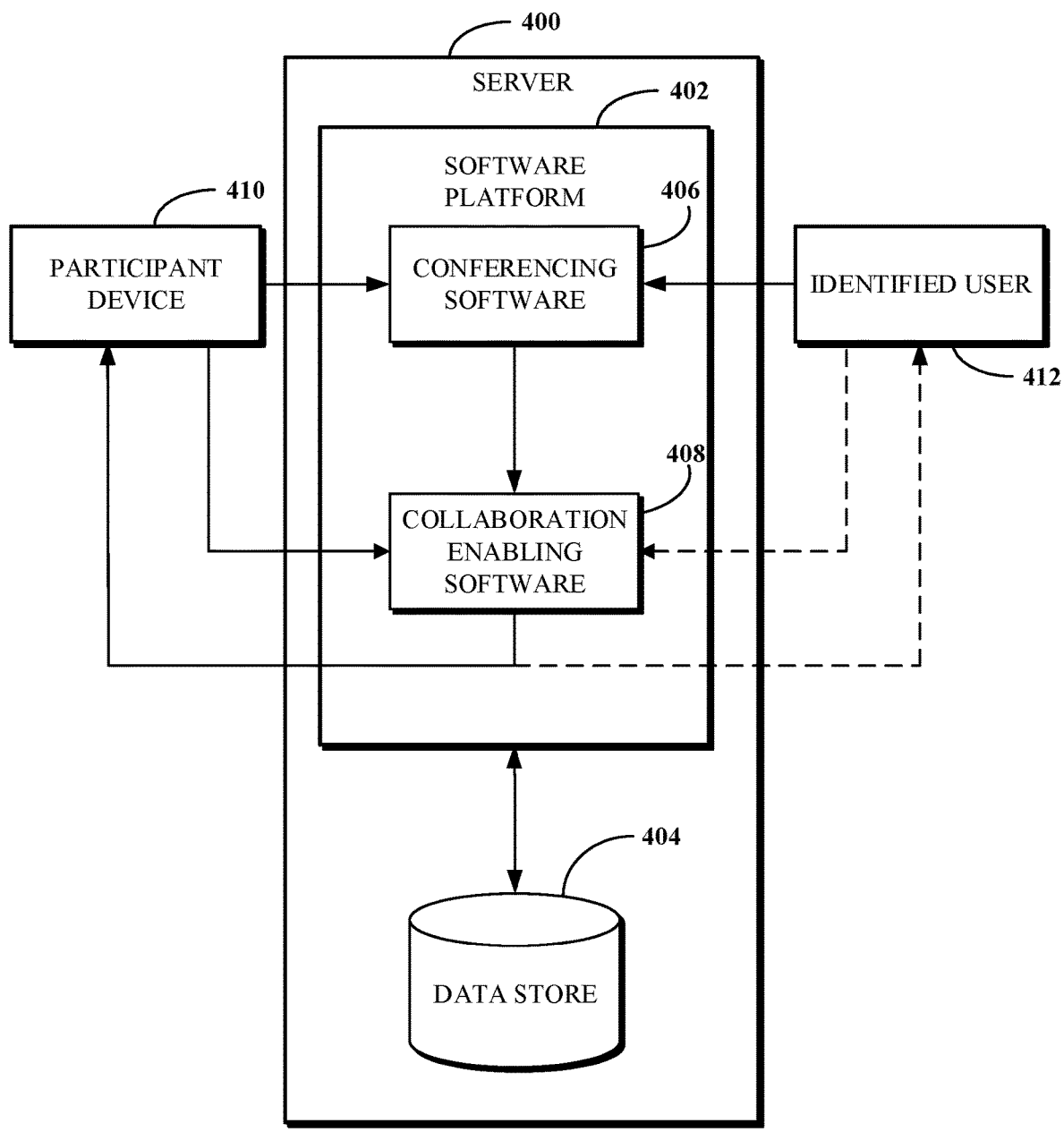
FIG. 4 is a block diagram of an example of a server for identifying users to be notified of events occurring at conferences based on real-time analyses of transcripts of the conferences.

FIG. 4 is a block diagram of an example of a server 400 for identifying users to be notified of events occurring at conferences based on real-time analyses of transcripts of the conferences. With respect to a conference, the server 400 can analyze, while the conference is ongoing, a transcript of verbal or textual communication exchanged during the conference to identify users. Identified users are users who are not currently in the conference and to whom the server 400 may transmit notifications of events occurring at the conference. As mentioned above, the conference can be an audio-based conference, a video-based conference, or another type of virtual space where multiple participants may be virtually assembled. It is noted that references to "real-time transcripts" should be understood to encompass that the transcript is also analyzed in real time (i.e., while the conference is ongoing).

As shown, the server 400 implements or includes a software platform 402 and a data store 404. The server 400 can be one or more servers implemented by or included in a datacenter, such as the datacenter 106 of FIG. 1. The software platform 402 provides conferencing services (e.g., capabilities or functionality) via a conferencing software 406. The software platform 402 can be or can be part of the software platform 300 of FIG. 3. The conferencing software 406 can be variously implemented in connection with the software platform 402. In some implementations, the conferencing software 406 can be included in or can work in conjunction with one or more of the telephony software 312, the messaging software 316, or the other software 318 of FIG. 3. For example, the conferencing software 406 may be or may be integrated within the telephony software 312. In another example, the conferencing software 406 may be or may be integrated within the conferencing software 314.

The data store 404 can store data related to users and conferences, as further described herein. The data store 404 can be included in or implemented by a database server, such as the database server 110 of FIG. 1. The data store 404 can include data related to scheduled or ongoing conferences and data related to users of the software platform 402.

The data store 404 can include one or more directories of users. At least some of the users of the software platform 402 can be identified as identified users. The users may be organized into groups according to one or more hierarchies using any suitable format. One hierarchy can be a reporting structure hierarchy (e.g., an org-chart) that may include information such as user names, names of managers of the users, names of sub-organizations, departments, groups, etc., to which the users belong, contact information (such as email addresses, telephone numbers, office locations), and the like. The users may be grouped into project-based hierarchies. Other hierarchies are possible. Employee information may also be associated with users with the data store 404 where applicable. The employee information for a user can include an office address, a telephone number, an email address, project or group memberships, and the like.

At least some of the users may be associated (such as in one or more of the hierarchies of the data store 404) with respective keywords, skills names, skill descriptions, job descriptions, tags, and other information (collectively, TOIs) that can be used to identify the users. At least some of the TOIs may be described or organized according to an occupational model that may include occupation-specific descriptors and tasks.

A participant device 410 can be a device of user who is configured (e.g., enabled) to or otherwise can join a conference. The participant device 410 may, for example, be one of the clients 304 through 310 of FIG. 3. The participant device 410 may include an application (not shown) that may be a client application. Although FIG. 4 illustrates one participant device, as can be appreciated, participant devices of multiple respective users can simultaneously connect to a conference. Similarly, the conferencing software 406 can enable many conferences to be concurrently active. Participants in a conference contribute content to the conference. Depending on a type of the conference, participants may contribute (e.g., exchange) at least verbal content, textual content, visual content, or a combination thereof. For example, a participant may say something or may type text (such as in a chat box associated with the conference). The software platform 402 transmits content contributed by other participants to the participant device 410. The software platform 402 receives content contributed by the user of the participant device 410 and transmits such content to other participants (if any).

The software platform 402 also includes collaboration enabling software 408. The collaboration enabling software 408 can be included in or work in conjunction with the conferencing software 406. While a conference is ongoing, the collaboration enabling software 408 obtains a transcript of the content contributed by participants to identify users. It is noted that content may be contributed by a sole, current participant of the conference. To illustrate, and as further explained below, the sole participant may say "Anyone here an expert on the Alpha project?"

The transcript is obtained incrementally (e.g., in portions) and analyzed in real time. As can be appreciated, real-time encompasses near-real time to account for any required processing. A new transcript is obtained for every new portion of the content contributed during the conference. The collaboration enabling software 408 may obtain a transcript on a rolling window basis, or a sliding window basis, or some other way of obtaining portions of the content contributed during the conference, as further described with respect to FIG. 5. In an example, a most recent transcript obtained for a most recent portion of the content may be added to a cumulative transcript and the cumulative transcript may be analyzed. In some implementations, the cumulative transcript can be obtained for a maximum duration of time. As such, the cumulative transcript can be a rolling cumulative transcript. To illustrate, and without limitations, a new transcript may be obtained every 15 seconds and the rolling cumulative transcript can have a duration of 2 minutes.

The collaboration enabling software 408 continuously obtains a transcript and analyzes the transcript to obtain a content analysis result. The content analysis result can be used to identify one or more users (such as an identified user 412) to whom the collaboration enabling software 408 can send or cause notifications to be sent. TOIs associated with users can be matched to the content analysis result to identify the users. The collaboration enabling software 408 can transmit the notification to the identified user 412 in a number or combination of ways. In some examples, the notification can be: a text message that is sent to a telephone number associated with the identified user 412; a telephone call that is placed to the telephone number; an email that is sent to an email address associated with the identified user 412; a message that is sent to the identified user 412 via a collaboration/messaging application associated with or communicating with the software platform 402; or a combination thereof. Users may configure their preferred notification modalities.

In response to a received notification, the identified user 412 may transmit a request to the software platform 402 to join the conference. After joining the conference, the identified user 412 may be able to observe (e.g., read, listen to) content of the conference, contribute content to the conference, or both.

Figure 5:
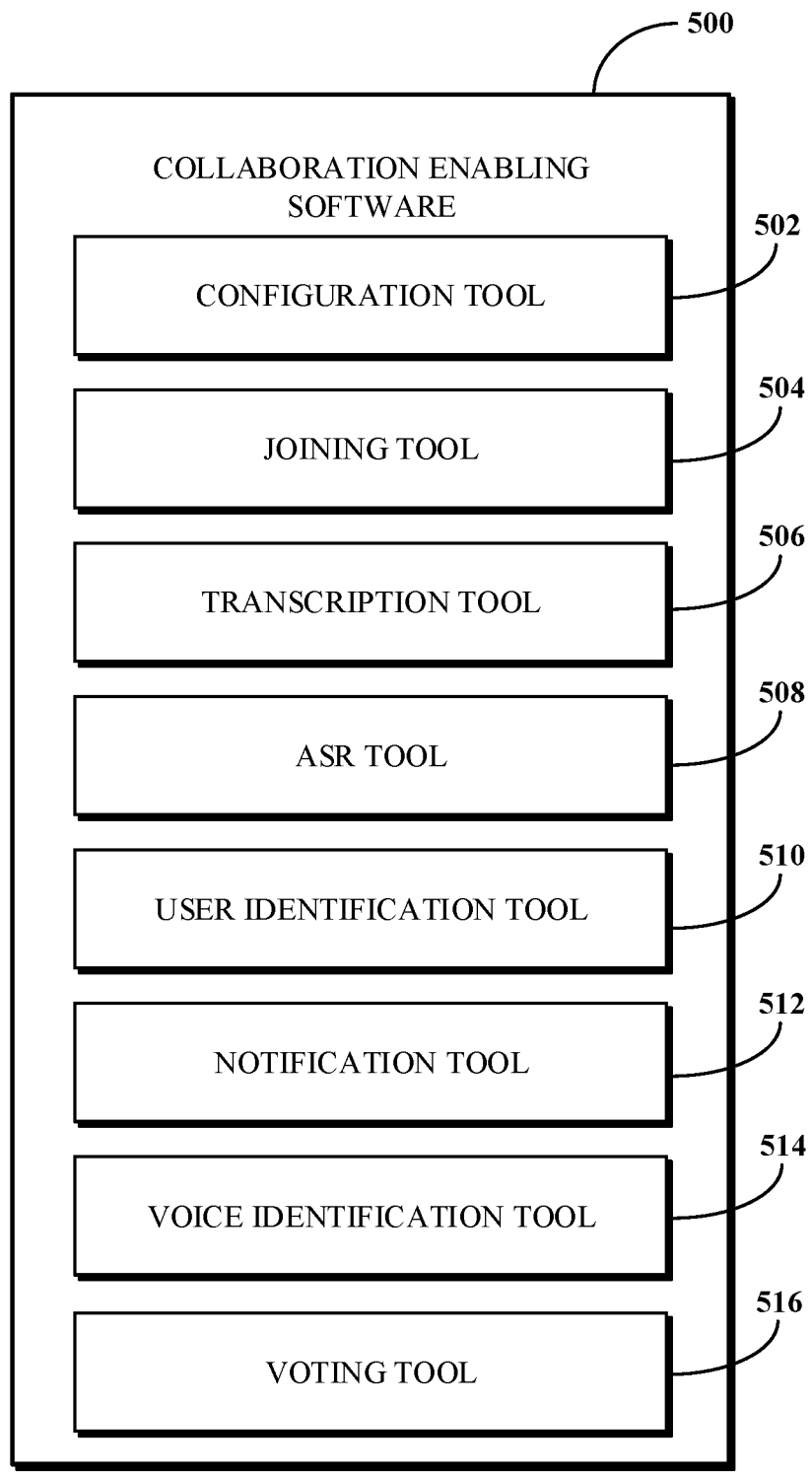
FIG. 5 is a block diagram of example functionality of collaboration enabling software.

FIG. 5 is a block diagram of example functionality of collaboration enabling software 500, which may be, for example, the collaboration enabling software 408 shown in FIG. 4. The collaboration enabling software 500 includes tools, such as programs, subprograms, functions, routines, subroutines, operations, executable instructions, and/or the like for identifying users and transmitting notifications to the identified users. At least some of the tools can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the collaboration enabling software 500 includes a configuration tool 502, a joining tool 504, a transcription tool 506, an automated speech recognition (ASR) tool 508, a user identification tool 510, a notification tool 512, a voice identification tool 514, and a voting tool 516. In some implementations, the collaboration enabling software 500 can include more or fewer tools. In some implementations, some of the tools may be combined, some of the tools may be split into more tools, or a combination thereof.

The configuration tool 502 can provide facilities (e.g., user interfaces (UIs) or services) that can be used to configure (e.g., set up or create) conferences according to the implementations of this disclosure. In an example, a conference may be configured as an always-on conference, as an on-demand conference, or as a scheduled conference. The configuration tool 502 can also make available a list of at least some of the configured conferences. For example, a user may navigate, such as using a web browser, to a web page that includes at least a subset of the configured conferences including respective connection information. A user can attempt to join any of the available conferences using the conference connection information. A user can also configure multiple conferences, subject to limitations imposed in connection with his or her user account. For example, each of the multiple conferences can be configured for a different purpose (e.g., one for a work team, one for a fantasy football league, and one for a hobby group).

Once configured, the conferencing software 406 automatically starts an always-on conference. Once started, the conferencing software 406 does not terminate an always-on conference even if no participants join or all participants leave the conference. An always-on conference may be terminated by the user that configured the conference or by another user (e.g., an administrator) who is privileged (e.g., has access controls) to terminate conferences. An always-on conference may be configured to not have an end date (i.e., a termination date).

An on-demand conference does not have a specific start time, end time, or recurrence information. The conferencing software 406 starts or restarts, as applicable, an on-demand conference any time that a first user joins the conference and terminates when no participants remain in the conference. That is, the conferencing software 406 starts or restarts, as applicable, an on-demand conference in response to receiving a request from the first user to join the on-demand conference.

A scheduled conference is one that is configured to have a start time and an end time (e.g., expressed as a conference duration), and may optionally include recurrence information. The conferencing software 406 permits (i.e., accepts requests from) invitees to join a scheduled conference once a host joins the scheduled conference or within a predefined time window (e.g., 15 minutes) before the start of time of the scheduled conference (whichever is earlier). If a request to join a scheduled conference is received before the predefined time window or before the host joins, the conferencing software 406 may in at least some cases accept the request and indicate to the requester that the conference is currently unavailable. The conferencing software 406 may abruptly end an ongoing scheduled conference at the end time or may continue the ongoing scheduled conference past the stated end time.

Via the configuration tool 502, a conference can be configured to be public or private. A public conference is such that any user can use the conference access information (e.g., a hyperlink, a telephone number, or a group name) to join (i.e., to participate in) the conference. In some implementations, where the server 400 is deployed in an enterprise (e.g., for use by a customer of the software platform 402), only members of the enterprise can join a public conference. On the other hand, a private conference is configured to include joining criteria.

A conference may be configured to have a recording window. The recording window is a maximum length of time for which the most recent content of a conference can be temporarily saved for transmission to the participants upon request. Recording windows are further described below. In an example, if a recording window is not configured for a conference, then saving content of the conference will not be possible. In another example, if a recording window is not configured for a conference, then the recording window can be a default recording window. In an example, the default recording window can be equal to the predefined time window described above. In an example, the recording window cannot be configured to be longer than a defined maximum recording window (e.g., 10 minutes, 15 minutes). As already mentioned, content recorded in a retention window may be only temporarily stored in anticipation of a request for the recorded content. If no request is received, the recorded content may be permanently discarded.

Joining criteria of a private conference designate (e.g., define, identify, list) the users that can join the conference. The software platform 402 can provide facilities (e.g., UIs or services) that can be used to configure joining criteria for a conference. For example, in the process of setting up a conference, a conference organizer can provide the joining criteria. The joining criteria may include a specific list of users that can join a private conference. Thus, the joining criteria may include identifiers of users, such as telephone numbers, email addresses, unique user identifiers (i.e., user IDs). To illustrate, a private conference may be named "Dorothy's Book Club" and the joining criteria may list the users athos@companyName.com, aramis @ companyName.com, and porthos@companyName.com.

The joining criteria may include an implicit list of users. One or more predicates can define the implicit set of users. A user (e.g., information associated therewith) can be tested to determine whether the user meets the predicate (i.e., where the predicate is true for the user) or does not meet the predicate (i.e., where the predicate is not true for the user). To illustrate: the joining criteria of a private conference named "VP Forum—Management Book Club" may include the predicate that codifies the rule "has a title of VP or above"; the joining criteria of a private conference named "The Lake Shore Drive Watercooler" may include the predicate that codifies the rule "all users having an office address that includes Lake Shore Drive"; and the joining criteria of a private conference named "Project Alpha and friends" (i.e., a conference for the members of the project code-named Alpha and other users who support, but are not officially members of, the project team) may include a predicate that codifies the rule "member of Project Alpha" and the users alexander@companyName.com and dumas@companyName.com. The configuration tool 502 may use (e.g., leverage services of) the joining tool 504 to identify users and define predicates.

The configuration tool 502 may provide facilities that enable users to provide at least a subset of the respective TOIs associated with the users. That is, users can use the configuration tool 502 to identify (e.g., configure, define, or set) TOIs for themselves. For example, a user may directly enter text of the TOIs for which he or she would like to be notified. The user may additionally provide the configuration tool 502 one or more TOI sources that the configuration tool 502 can analyze to extract TOIs. For example, the user may enable the configuration tool 502 to access a calendar of the user, a social media profile of the user, documents of the user (e.g., files in a storage location, internet web pages, or intra-net web pages), or other TOI sources. The software platform 402 can also automate the identification of TOIs for users, such as by analyzing the sources of TOIs to extract suggested TOIs. For example, with respect to calendar entries, the configuration tool 502 can scan the calendar for meeting titles and agenda items to extract strings that may be used as suggested TOIs. In at least some cases, the suggested TOIs identified by the software platform 402 can be displayed to the user for approval. The user can select the desired TOIs from the suggested TOIs. The configuration tool 502 may include or leverage natural language processing techniques or tools to obtain the suggested TOIs from one or more of the sources of TOIs. In an example, term frequency-inverse document frequency (TFIDF) may be used to obtain the suggested TOIs.

In at least some cases, TOIs can be defined in the context of specific conferences. For example, a user can identify the TOI "investor relations" in association with the conference titled "VP forum." As such, the user can be notified, as further described herein, when any participant mentions or the participants otherwise discuss a topic that is related to investor relations in the "VP forum" conference. A TOI may not necessarily be configured in the context of a particular conference. For example, a user may configure the TOI "project Alpha." As such, when the "project Alpha" TOI is mentioned in a public conference or conferences for which the user meets the joining criteria, the user may be notified.

Joining tool 504 can be used to configure conference joining criteria, as described above. When the software platform 402 receives a request from a user to join a conference, the joining tool 504 can be used to determine whether the user meets (e.g., satisfies) the joining criteria. For example, when a user attempts to join a conference via the conferencing software 406 of FIG. 4, the conferencing software 406 may transmit a request, that includes an identifier of the user, to the joining tool 504, which then responds with whether the user should be allowed to join the conference. The joining tool 504 can use the conference joining criteria and information associated with the user in the data store 404 to determine whether the user meets the joining criteria.

The transcription tool 506 can be used to generate (e.g., obtain) real-time transcripts of portions of the content of a conference. The real-time transcript is generated in real-time concurrently with the conference based on real-time content (e.g., verbal conversations, text messages, and/or visual content) presented within the conference. The real-time transcript can be generated using a transcription engine that is part of or is accessible by the transcription tool 506. The transcription engine can access audio of conferences. In an example, the audio conferences may be implemented by the conferencing software 314 of FIG. 3. The transcription engine can access audio of conferences in any number of ways, including having direct access to the audio data as the data is received from users, having access to a real-time recording of the audio data, receiving the audio data from the collaboration enabling software 500 (such as from transcription tool 506). As mentioned above, the real-time transcript can be obtained on a rolling window or a sliding window basis. Generating the real-time transcript may include or otherwise refer to generating a portion of the real-time transcript corresponding to a current conversation occurring at a given time during the conference. In an example, the transcription tool 506 may use a service (e.g., a cloud-based transcription service or engine) to obtain real-time transcripts. For example, a voice-based communication may be transmitted to the service and the service can return a transcript. The real-time transcript can be used to obtain a content analysis result, as further described below.

In the rolling window case, the collaboration enabling software 408 may obtain a transcript for every predefined time window (e.g., 10 seconds, 15 seconds, or some other time window). To illustrate, and assuming a time window of 15 seconds, the collaboration enabling software 408 obtains a transcript associated with the content in the time window 10:15 (e.g., 10 minutes and 15 seconds from the start of the conference) to 10:30, followed by a transcript associated with the time window 10:30 to 10:45, followed by a transcript associated with the time window 10:45 to 11:00, and so on. As such, the time windows do not overlap. Each of the obtained transcripts is analyzed separately from any previously obtained transcripts.

In the sliding window case, the time windows overlap by a time offset. To illustrate, and assuming a time window of 15 seconds and a time offset of 5 seconds, the collaboration enabling software 408 obtains a transcript associated with the content in the time window 10:15 to 10:30, followed by a transcript associated with the time window 10:20 to 10:35, followed by a transcript associated with the time window 10:25 to 10:40, and so on. Each of the obtained transcripts is analyzed separately from any previously obtained transcripts.

While a conference is ongoing, the ASR tool 508 may be configured to detect commands issued by the participants to the collaboration enabling software 500. The ASR tool 508 may be configured to recognize that a certain key combination or a combination of words issued by a participant indicates to the collaboration enabling software 500 that the participant will request that the collaboration enabling software 500 perform an action on behalf of the participant.

In an example, the ASR tool 508 may be configured (e.g., programmed) to transmit joining requests in response to participant commands. To illustrate, a participant may say "hey conference, get Joe," where the ASR tool 508 is configured to recognize that what follows "hey conference" is a command to the ASR tool 508. In response to the command, the ASR tool 508 can identify (e.g., find or match), amongst the users that meet the joining criteria, one or more users named Joe and transmit respective requests to those users to join the conference. As another illustration, a participant may say "hey conference, get a Linux expert." In response to the command, the ASR tool 508 can identify, amongst the users that meet the joining criteria, one or more users associated with a TOI that includes a Linux expertise and transmit respective requests to those users to join the conference.

As already mentioned, in some situations, multiple users may match the command. In an example, the ASR tool 508 may prompt the requester to identify the specific users to be notified. In another example, the ASR tool 508 may obtain, from the user identification tool 510, a list of users identified based on the transcript and match those identified users to the multiple users matching the command.

In another example, or additionally, users may be identified based on relationship strengths. As mentioned above, users may be organized into hierarchies. Each of the hierarchies can be stored as or can be thought of as a directed graph that can be used to identify relationship strengths (e.g., degrees of separations) between any two users.

Relationship strengths may be identified in any number of ways. In a simple example, a relationship strength between a first user and a second user can be identified based on a number of edges to be traversed in a hierarchy from a first node representing the first user to a second node representing the second user. As such, if the second user is the immediate manager of the first user, then the relationship strength between the first and the second users may be 1; if the second user is a peer of the first user, then the relationship strength may be 2; if the managers of the first user and the second user report to the same manager, then the relationship strength between the first and the second users may be 4. Other ways of obtaining relationship strengths are possible. For example, different weights may be associated with directions of edge traversals (e.g., upward traversal vs. downward traversal).

Using the users that match the joining criteria and at least one of the participants (e.g., the participant whose content resulted in identifying the users) as inputs, the specific users can be identified using the relationship strengths. For example, the specific user having the closest relationship (i.e., strongest relationship) to the participant can be selected. Data associated with the users of the one or more hierarchies can be matched with the data for identifying the users in commands. The data for identifying potential users in commands can be a full name, a partial name, a nickname, a job function, a title, a telephone number, an extension number, any data that may be used to identify a user, or a combination thereof.

In an example, the ASR tool 508 may be configured to record content in response to participant commands. To illustrate, the participants may recognize, after having had a conversation regarding a topic, that the conversation should be retained because the details are not likely to be remembered later. As such, one participant may issue the command "hey conference, keep that." In response to the command, the ASR tool 508 may save the content of the recording window defined for the conference, ending at the time that the command was issued, and transmit the saved content to the current participants. The recording type may depend on the conference type. For example, the recording may be an audio recording, a video recording, a text transcript, or some other recording.

In an example, the ASR tool 508 may be configured to receive a command to schedule a meeting with at least a subset of the current participants. For example, one participant may say "hey conference, schedule a meeting for Monday at 1:00 for all of us" or "hey conference, schedule a meeting for Monday at 1:00 for Mike and I." In response to the command, the ASR tool 508 can transmit a request to a calendaring application to schedule the requested meeting. The ASR tool 508 can parse the command to determine who the attendees should be. For example, "for all us" is interpreted as setting all of the current participants as invitees. For example, based on the string "Mike and I," the ASR tool 508 identifies the current speaker (i.e., the participant that issued the command) and another participant associated with the label (e.g., name, nickname, title) "Mike" as the meeting invitees.

In an example, the ASR tool 508 may be configured to receive commands related to user identification. For example, a command may be "hey conference, stop identifying users." In response to receiving such a command, the transcription tool 506 stops obtaining transcripts and the ASR tool 508 stops listening for and performing commands.

The user identification tool 510 identifies users who are not current participants of the conference based on the transcript (i.e., the real-time transcript). A user may be identified based on data for identifying users included (e.g., identified) in the transcript. Data for identifying users can include a full name, a partial name, a nickname, a job function, a title, a telephone number, an extension number, other data that may be used to identify a user, or a combination thereof. As such, the user identification tool 510 can be, use, or otherwise include a machine learning model that may be trained to identify data for identifying users in transcripts. To illustrate, the transcript may include "Jules knows about this stuff; we should talk to him," which the user identification tool 510 uses to identify the user "Jules Verne" as an identified user.

The identified user may be identified based on topics (e.g., words or word groups) extracted from the transcript. In an example, the transcript can be tokenized and cleaned. Tokenizing can split the transcript into a word vector (e.g., words and/or groups of groups (collectively, n-grams)), typically using special characters and/or white spaces to identify the n-grams. Cleaning (e.g., normalizing) the words of the transcript, which may be performed before or after the tokenizing, can include zero or more of stemming, removing stop words (e.g., very common, words that do not add value to the title) from the word vector, other steps, or a combination thereof. The obtained n-grams can be matched to the TOIs associated with the users to identify the users. The user identification tool 510 matches the n-grams to the TOIs of users that match the joining criteria of the conference. Identifying a user based on the transcript can include identifying the user based on semantic relationships (e.g., similarities) between the transcript (e.g., n-grams of the transcript) and the TOIs associated with the user. The user identification tool 510 can include or use a model (e.g., a machine learning model) that, given an n-gram, identifies semantically related words or concepts that can be used to match against the TOIs associated with users. Semantic relationships can include synonymy (e.g., 2 words have the same meaning), antonym (e.g., 2 words have opposite meaning), and hyponymy (e.g., the meaning of one word (vehicle) includes the meaning of other words (bus, car, and van)) relationships.

The notification tool 512 transmits (e.g., sends) notifications to identified users. A notification can include or otherwise indicate a reason the identified user is receiving the notification. The reason can include any TOIs identified by the collaboration enabling software 500 for the identified user. The notification can include details of the conference, such as the title of the conference. In an example, the notification can include conference joining details that the identified user can use to join the conference. The notification can include a list of current participants of the conference. The notification can include the specific participants whose content resulted in the identification of the user. An example of a template of a notification can be "<TOI> was mentioned by <participant> in <conference title>. You can join the conference by clicking <link> or calling <telephone number>. The current participants are <participants>," where tokens surrounded by the symbols < and > are placeholders to be substituted with specific details.

In some examples, the notification tool 512 does not transmit a notification to an identified user unless a confirmation (e.g., approval) to transmit the notification is obtained from at least one of the participants. For example, a conference may be configured (such as via the configuration tool 502) such that no notifications are transmitted without explicit confirmation by at least one participant. For example, a user may set a preference such that the user must explicitly confirm any notifications to be transmitted by the notification tool 512 based on conference content provided by the user.

The notification tool 512 causes a prompt (e.g., a message or a dialog) requesting the confirmation to be presented. The prompt may be presented in one or more modalities. In an example, the prompt is presented to the participant whose content resulted in identifying the user. In an example, the prompt is verbally presented to all participants and must be confirmed by at least a subset of the participants (e.g., one, a plurality, a majority, or all of the participants). In an example, the notification tool 512 may orally present the prompt. To illustrate, the notification tool 512 may interject with a voice prompt using a template "Pardon the interruption, <identified user> wants to be notified when <TOI> is mentioned. Should I notify <identified user>?" If the notification tool 512 receives a response that indicates approval (e.g., "yes," "yeah," "go for it," "yup"), then the notification is transmitted to the identified user. If the notification tool 512 does not receive a response that indicates approval (e.g., "nope," "no," "don't do that"), then no notification is transmitted to the identified user. If no response is received within a predefined time period (e.g., 3 seconds), then a notification is not sent to the identified user. The predefined time period can be empirically selected (e.g., configured) so as to minimize the length of time between the mention of the TOI in the conference and the time that the identified user is notified. If too much time lapses, then the conversation may move on to other topics and the identified user would miss the TOI discussion.

An example of the prompt is described with respect to FIG. 6. FIG. 6 is an example of a prompt 600 requesting confirmation to transmit a notification to an identified user. With the prompt 600, the notification tool 512 is requesting approval from a participant to transmit a notification to an identified user 604 (i.e., the user named "DR. WATSON") that a TOI 602 relevant to the identified user 604 (i.e., "BOWLING") was mentioned. The prompt 600 may be presented to the conference participant who may have mentioned the TOI 602 or whose content resulted in the identification of the TOI 602. If the participant selects an approval option (e.g., a button 606), then the notification is transmitted to the identified user. If the participant selects a disapproval option (e.g., a button 608), then no notification is transmitted to the identified user. In an example, the prompt 600 may include a timer 610 that counts down a predefined number of seconds. If the participant does not select one of the button 606 or the button 608 within the countdown period, then the prompt 600 closes and no notification is transmitted to the identified user.

Returning to FIG. 5, the voice identification tool 514 determines whether content (e.g., speech) associated with a detected voice should be transcribed. The user identification tool 510 can ensure that speech associated with only conference participants is transcribed. To illustrate, one participant may have joined the conference from a public area. As such, while the participant is in the conference, others around the participant may also be speaking. The speech of such others should not be used to identify users.

In an example, signal processing techniques can be used to identify the signal with the highest quality (e.g., strongest signal). The signal with the highest quality can be assumed to be that of the participant and can be transcribed, as described herein. In another example, voice separation techniques can be used to associate different detected voices with different speakers. Respective voice fingerprints may be pre-associated with conference participants. As such, a voice detected over a connection can be matched to the voice fingerprint of the user associated with the connection to determine whether the voice is that of the participant associated with the connection. If so, speech associated with the voice is transcribed as described herein; otherwise the speech is ignored.

The voice identification tool 514 can also determine, such as based on a participant selection, whether to suspend using content from the participant to identify users. Via commands, options, user interface controls, or the like (collectively, "an indication to disable transcription") participants may suspend using their content for user identification. To illustrate, a participant that joins a conference using a telephone, may press a predefined key combination (e.g., #-3) to suspend using content contributed by the participant until another key combination is pressed; and a participant joining the conference using a graphical user interface, may use a user interface control to, for example, toggle whether content contributed by the participant is to be used for user identification. When transcription is disabled (in response to the indication to disable transcription) other participants are still able to, for example, hear the participant but no transcript is obtained of the speech of the participant.

In some implementations, the collaboration enabling software 500 makes available the TOIs configured by users. For example, a user who meets the joining criteria of a conference can view a list of TOIs configured by another user who meets the joining criteria of the conference. Using the voting tool 516, users can vote on the TOIs configured by other users. Said another way, with respect to a TOI configured by a user, other users can vote on whether the software is to listen for (e.g., detect, identify) the TOI on behalf of the user. If the vote is such that the software is not to identify the user based on the TOI, then if the TOI is identified based on a real-time transcript, the user would not be identified and, consequently, no notification is sent to the user. Different voting rules may be configured for a conference. The voting rule for a conference can be a majority wins rule, a plurality wins rule, or unanimous vote rule. Other voting rules are possible.

FIG. 7 is an example 700 of a notification received by an identified user in a text messaging application. The identified user may receive, on a user device 702, a notification 706 in a UI 704 of the messaging application. The notification 706 can indicate the reason that the identified user is receiving the message. For example, the notification can indicate that a TOI to the identified user was mentioned. The notification can provide a context for the notification. For example, the notification can include a title of the conference (e.g., "TTP WATERCOOLER") where the TOI (e.g., "BOWLING") was mentioned. The notification can include a name (not shown) of the participant whose content resulted in identifying the TOI and/or the identified user. The notification can include more, fewer, or other information.

The notification can include actions (e.g., "JOIN" and "SEE WHO'S ON") that the identified participant can perform. Two actions are illustrated herein; however, more, fewer, or other actions are possible. Alternatively, or additionally, the actions can be provided by or in the messaging application instead of the notification itself. For example, by choosing an action 708, a request is transmitted to the software platform 402 of FIG. 4 requesting to join the identified user to the conference. For example, by choosing an action 710, a request is transmitted to the software platform 402 to obtain a list of the current participants in the conference. In the response to the request, the software platform 402 responds with a message 712 that includes a list of at least some of the current participants.

The identified user may transmit a message 714 in response to the notification without joining the identified user to the conference. The notification tool 512 may present the response message of the identified user to the participants of the conference. For example, respective UIs that include the response message may be displayed to those participants that joined the conference using application that can display UIs. In another example, an oral message may be presented to those users that have an audio connection to the conference. For example, an audible message may state "Pardon the interruption, Dr. Watson said: I wanna talk bowling. Will join in 10."

In some implementations, the identified user may be able to transmit no more than a predefined number of response messages (e.g., one message) in response to a received notification. Messages received from the identified user after the predefined number of response messages are not presented to the other participants and the notification tool 512 can send a message back to the identified user informing the user that the messages are not presented to the participants. Too many response messages from the identified user may be become too disruptive to the conference participants.

Figure 8:
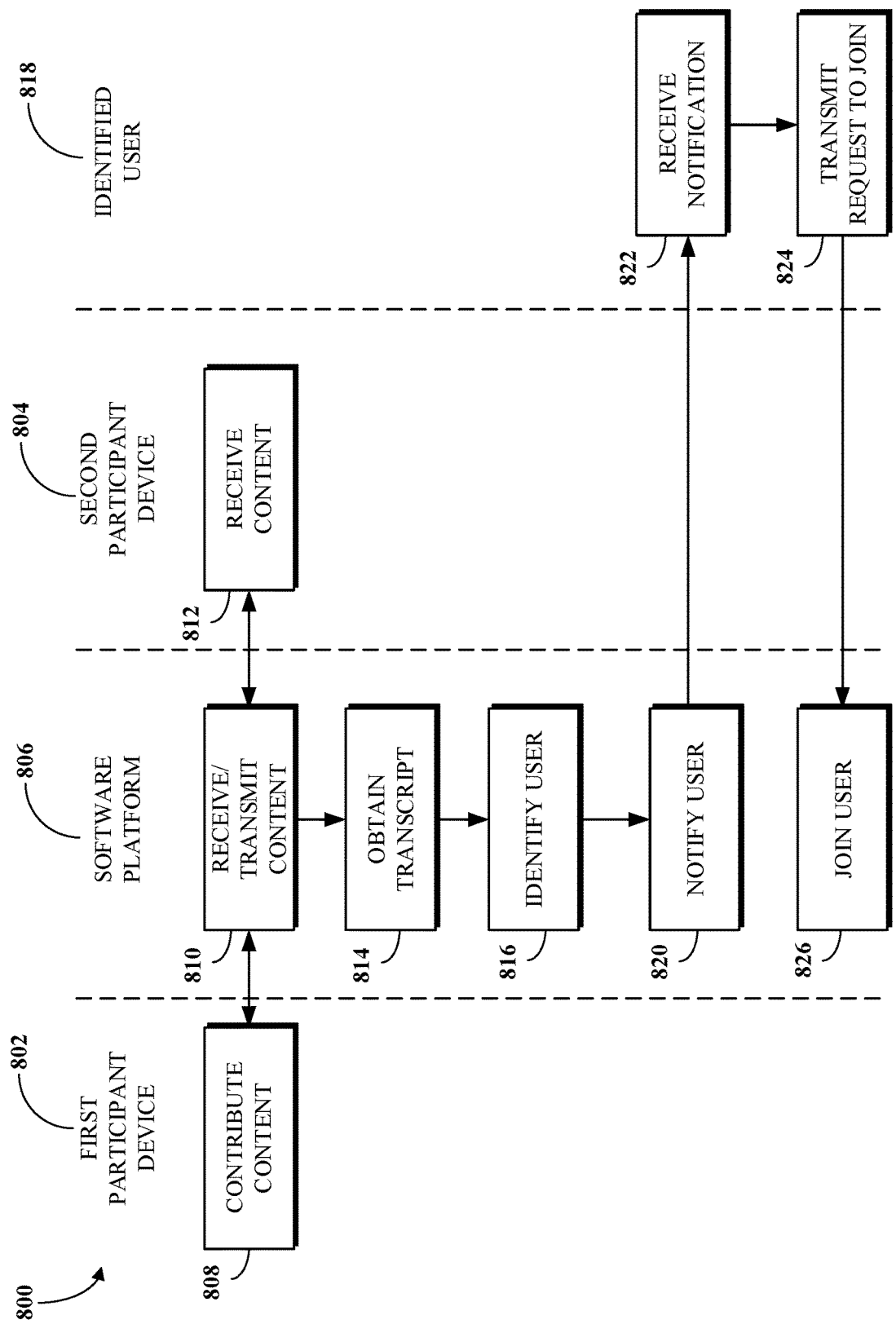
FIG. 8 is an example of an interaction diagram illustrating sending a notification to an identified user.

FIG. 8 is an example 800 of an interaction diagram illustrating sending a notification to an identified user. The example 800 illustrates that two participants using respective participant devices, a first participant device 802 and a second participant device 804, are current participants of a conference hosted by a software platform 806. The first participant device 802 the second participant device 804 can each be the participant device 410 of FIG. 4. The software platform 806 can be the software platform 402 of FIG. 4. While two participant devices are illustrated, one or more than two participants can be joined to the conference.

At 808, the first participant contributes content to the conference via the first participant device 802. At 810, the software platform receives the content and transmits it to the second participant device. At 812, the content is received at the second participant device and presented to the second participant. While not specifically shown, more content can be exchanged, via the software platform 806, by the first participant and the second participant. At 814, the software platform 806 obtains a transcript, such as described with respect to the transcription tool 506 of FIG. 5. At 816, a user 818 is identified, such as described with respect to the user identification tool 510 of FIG. 5. At 820, a notification is sent to the identified user 818, as described with respect to the notification tool 512 of FIG. 5. At 822, the identified user 818 may receive the notification at a user device of the identified user 818. At 824, the identified user 818 can use the user device to transmit a request to the software platform 806 to join the conference. At 826, the software platform 806 joins the identified user 818 to the conference.

Figure 9:
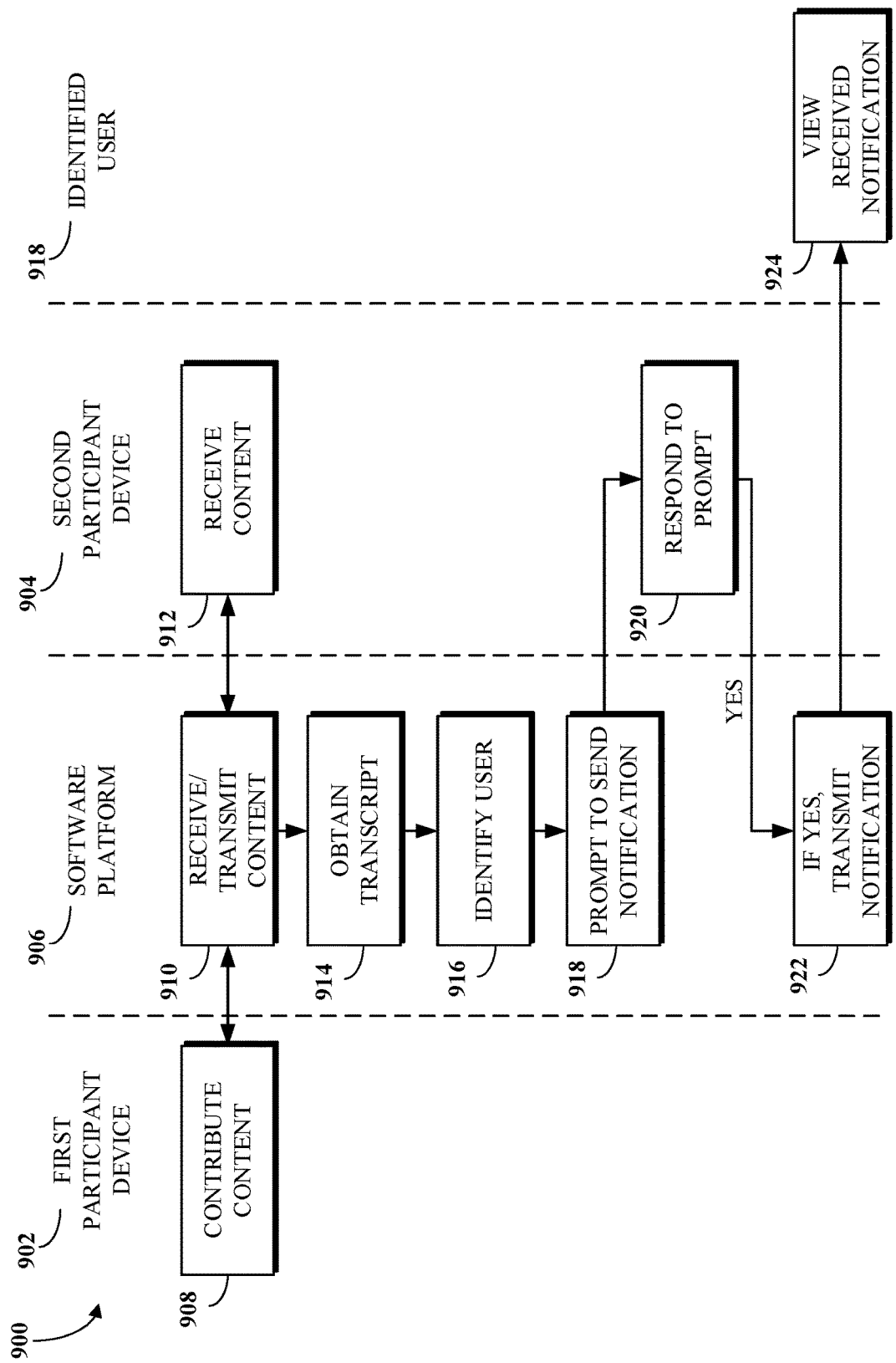
FIG. 9 is an example of an interaction diagram illustrating prompting a participant whether to send a notification to an identified user.

FIG. 9 is an example 900 of an interaction diagram illustrating prompting a participant whether to send a notification to an identified user. The example 900 illustrates that two participants using respective participant devices, a first participant device 902 and a second participant device 904, are current participants of a conference hosted by a software platform 906. The first participant device 902 the second participant device 904 can each be the participant device 410 of FIG. 4. The software platform 906 can be the software platform 402 of FIG. 4. While two participant devices are illustrated, one or more than two participants can be joined to the conference. The conference of the example 900 is configured such that no notification is sent to an identified user unless a confirmation (e.g., approval) to transmit the notification is obtained from at least one of the participants.

The example 900 includes blocks 908, 910, 912, and 914, which can be as described with respect to blocks 808, 810, 812, and 814 of FIG. 8, respectively, and descriptions therefor are omitted. At 916, the software platform 906 identifies the user 918. The user 918 is assumed to be identified based on content contributed by the second participant. As such, at 918, the software platform 906 transmits a prompt to the second participant device 904 requesting approval from the second participant to send the notification to the identified user 918. At 920, the second participant device 904 transmits a response indicating disapproval (e.g., "YES"). At 922, the software platform determines whether an approval response (e.g., "YES") is received. As an approval response is received, then the notification is sent. At 924, the user 918 may view the notification using a device of the user 918. The user may join the conference, as described with respect to 824 of FIG. 8. However, if a disapproval response were received, then no notification would be sent to the identified user 918.

Figure 10:
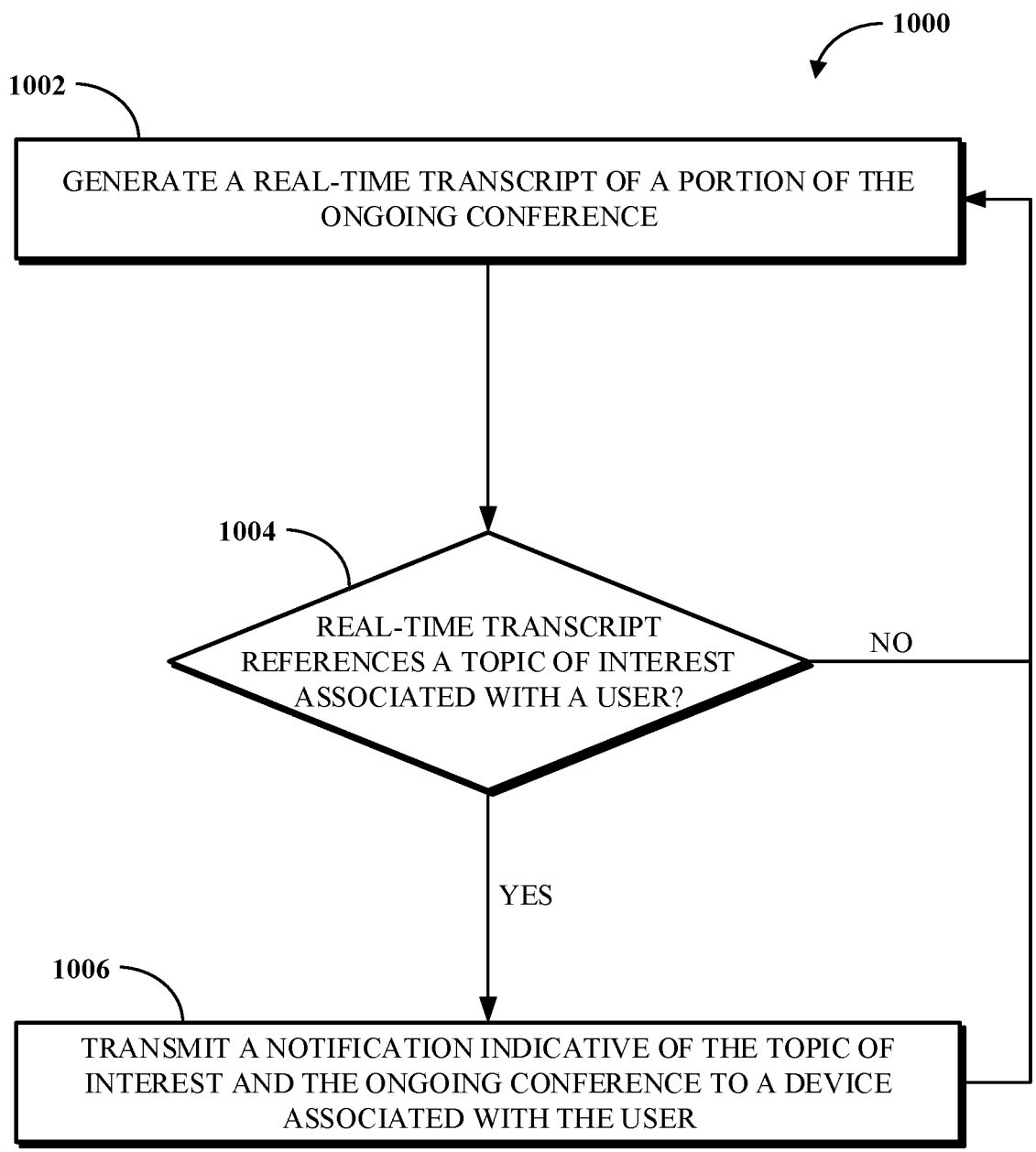
FIG. 10 is a flowchart of an example of a technique for identifying and notifying users based on a real-time analysis of a transcript of a conference.

To further describe some implementations in greater detail, reference is next made to examples of techniques which may be performed by or using content-based conference notifications. FIG. 10 is a flowchart of an example of a technique 1000 for identifying and notifying users based on a real-time analysis of a transcript of a conference. The technique 1000 can be executed using computing devices, such as the systems, hardware, and software described with respect to FIGS. 1-9. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, a real-time transcript of a portion of an ongoing conference is generated. The real-time transcript can be generated using a transcription engine accessing audio of an ongoing conference implemented by a conferencing software. More accurately, the real-time transcript is generated for a portion of content of the ongoing conference. As described above, the real-time transcript is obtained in real-time. The ongoing conference can be an always-on conference that does not terminate when the ongoing conference includes no participants. Prior to obtaining the real-time transcript, the ongoing conference may not include any participants and a request may be received from a user to join the ongoing conference. The user is added to a list of current participants of the ongoing conference in the response to joining the user to the ongoing conference.

In an example, generating the real-time transcript can include obtaining a portion of a speech from a connection associated with a participant. The participant is identified as a first speaker in the portion of the speech. At least one second speaker other than the participant may be identified in the portion of the speech. The real-time transcript can be generated based on the speech of the participant and the speech of the at least one second speaker is disregarded (e.g., ignored, not used to obtain the real-time transcript).

At 1004, the technique 1000 detects whether a topic-of-interest associated with a user who is not a current participant of the ongoing conference is referenced within the real-time transcript. The topic-of-interest associated with the user can be detected to be referenced within the real-time transcript as described with respect to the user identification tool 510 of FIG. 5. If the real-time transcript is detected to reference the topic-of-interest, the technique 1000 proceeds to 1006; otherwise the technique 1000 proceeds back to 1002 to obtain another real-time transcript of a next portion of the ongoing conference. In an implementation, if the real-time transcript references is detected to reference the topic-of-interest, the technique 1000 proceeds simultaneously to 1002 and 1006.

Detecting that the topic-of-interest is associated with the user can include identifying the user based on an analysis of the real-time transcript. A TOI relevant to the user can be identified in the transcript and the user can be identified based on a determination that the TOI is associated with the user. The TOI can be associated with the user as a result of an analysis of calendar information of the user. Thus, the topic-of-interest may be associated with the user based on calendar information of the user. The TOI can be associated with the user as a result of an analysis of documents obtained from the user. Thus, the topic-of-interest may be associated with the user based on documents obtained from the user.

At 1006, a notification indicative of the topic-of-interest and the ongoing conference is transmitted to a device associated with the user. In an example, the notification includes a user interface element configured for accessing the ongoing conference. From 1006, the technique 1000 proceeds back to 1002 to obtain another real-time transcript of a next portion of the ongoing conference.

As described above, the notification may be sent in response to identifying the user. In an example, transmitting the notification includes obtaining, from a participant, a confirmation to send the notification and sending the confirmation to the user in response to receiving the confirmation. In an example, another user may be identified based on the real-time transcript. The technique 1000 may then determine whether to send a notification to the other user based on a response, received from the participant, to a prompt to confirm that the notification is to be sent to the other user.

In an example, and as described with respect to the ASR tool 508, the technique 1000 can include receiving commands from participants. In an example, the command can be to send a request to another user to join the ongoing conference. In response to receiving the command, the request is sent to the other user to join the ongoing conference. In an example, the command can be to schedule a meeting for a subset of current participants of the ongoing conference. In response to receiving the command, a request is sent to a calendaring software to schedule the meeting.

In an example, the technique 1000 can include receiving, from a participant, an indication to disable a transcription of the speech of the participant. The indication to disable the transcription is such that while the transcription is disabled, the other participants are able to hear the participant but no transcript is obtained of the speech of the participant.

In an example, the technique 1000 can include receiving a message from the user and presenting the message to the participants of the ongoing conference without joining the user to the ongoing conference. The message from the user can be received in response to the notification that was sent to the user. In an example, the technique 1000 can include associating a topic-of-interest with the user (such as in response to receiving a request from the user) and receiving respective votes from at least some users that meet joining criteria of the ongoing conference of identify the user based on the topic-of-interest, as described above with respect to the voting tool 516.

Some implementations may include a method that includes generating a real-time transcript of a portion of the ongoing conference. The real-time transcript may be generated using a transcription engine accessing audio of an ongoing conference implemented by a conferencing software. Responsive to detecting that a topic-of-interest associated with a user who is not a current participant of the ongoing conference is referenced within the real-time transcript, a notification indicative of the topic-of-interest and the ongoing conference may be transmitted to a device associated with the user. In an example, the ongoing conference may be an always-on conference that does not terminate when the ongoing conference includes no participants. In an example, the notification may include a user interface element configured for accessing the ongoing conference. In an example, the topic-of-interest may be associated with the user based on calendar information of the user. In an example, the topic-of-interest may be associated with the user based on documents obtained from the user. In an example, the method may further include receiving, from a participant, an indication to disable a transcription of speech of the participant. Transcription of the speech of the participant may be stopped while the transcription is disabled. The speech of the participant may be transmitted to other participants while the transcription is disabled. In an example, the method can further include receiving a message from the user. The message may be presented to participants of the ongoing conference without joining the user to the ongoing conference.

Some implementations may include a device that includes a memory and a processor. The processor may be configured to execute instructions stored in the memory to generate a real-time transcript of a portion of the ongoing conference. The real-time transcript may be generated using a transcription engine accessing audio of an ongoing conference implemented by a conferencing software. Responsive to detecting that a topic-of-interest associated with a user who is not a current participant of the ongoing conference is referenced within the real-time transcript, a notification indicative of the topic-of-interest and the ongoing conference may be transmitted to a device associated with the user. In an example, to transmit the notification indicative of the topic-of-interest and the ongoing conference can include to obtain, from a participant, a confirmation to send the notification. The confirmation may be transmitted to the user in response to receiving the confirmation. In an example, to generate the real-time transcript may include to obtain a portion of a speech from a connection associated with a participant. The participant may be identified as a first speaker in the portion of the speech. At least one second speaker other than the participant may be identified in the portion of the speech. The real-time transcript may be generated based on the speech of the participant and the speech of the at least one second speaker may be disregarded. In an example, the notification can include conference joining details. In an example, the processor can be further configured to execute instructions stored in the memory to receive, from a participant, an indication to disable a transcription of speech of the participant. The indication to disable the transcription can be such that while the transcription is disabled, the other participants are able to hear the participant but no transcription is obtained of the speech of the participant. In an example, the processor can be further configured to execute instructions stored in the memory to receive a message from the user. The message can be presented to participants of the ongoing conference without joining the user to the ongoing conference.

Some implementations may include a non-transitory computer readable medium that stores instructions operable to cause one or more processors to perform operations that include generating a real-time transcript of a portion of the ongoing conference. The real-time transcript may be generated using a transcription engine accessing audio of an ongoing conference implemented by a conferencing software. Responsive to detecting that a topic-of-interest associated with a user who is not a current participant of the ongoing conference is referenced within the real-time transcript, a notification indicative of the topic-of-interest and the ongoing conference may be transmitted to a device associated with the user. In an example, the operations can also include receiving from a participant of the ongoing conference a command to send a request to another user to join the ongoing conference. The request can be sent to the other user to join the ongoing conference. In an example, the operations can further include receiving from a participant a command to schedule a meeting for a subset of current participants of the ongoing conference. A request can be sent to a calendaring software to schedule the meeting. In an example, the operations can further include receiving, from a participant, an indication to disable transcription of speech of the participant. The indication to disable a transcription can be such that while the transcription is disabled, the other participants are able to hear the participant but no transcription is obtained of the speech of the participant. In an example, the operations can further include receiving a message from the user. The message can be presented to participants of the ongoing conference without joining the user to the ongoing conference. In an example, the operations can further include receiving respective votes from at least some users that meet joining criteria of the ongoing conference to identify the user based on the topic-of-interest. In an example, the operations can further include identifying another user based on the real-time transcript, wherein the other user is not a current participant of the ongoing conference. Whether to send a notification to the other user can be determined based on a response received from a participant of the ongoing conference to a prompt to confirm that the notification is to be sent to the other user.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   generating, using a transcription engine accessing audio of an ongoing conference implemented by a conferencing software and including participants, a real-time transcript of a portion of the ongoing conference, wherein generating the real-time transcript comprises:
  determining that audio accessed by the transcription engine includes speech from a person who is not a participant of the ongoing conference, wherein the speech from the person is included in audio data associated with one of the participants; and
  in response to determining that the audio accessed by the transcription engine includes the speech from the person who is not a participant of the ongoing conference, preventing the speech from the person from being included in the real-time transcript; and
responsive to detecting that a topic-of-interest associated with a user who is not a current participant of the ongoing conference is referenced within the real-time transcript:
  presenting, via the conferencing software, a real-time voting interface to at least some participants of the ongoing conference;
  identifying respective votes of at least some of the participants of the ongoing conference, wherein each of the respective votes indicates whether a notification indicative of the topic-of-interest is to be transmitted to the user responsive to detecting that the topic-of-interest is associated with the user, wherein each of the respective votes indicates whether a notification indicative of the topic-of-interest is to be transmitted to the user responsive to detecting that the topic-of-interest is associated with the user, and wherein the respective votes are collected in real-time from the participants of the ongoing conference via the real-time voting interface;
  determining, based on a voting rule, whether the respective votes indicate to transmit the notification; and
  in response to determining that the respective votes indicate to transmit the notification, transmitting the notification indicative of the topic-of-interest and the ongoing conference to the user.

2. The method of claim 1, further comprising:
terminating the ongoing conference in response to a termination request from a user privileged to terminate the ongoing conference.

3. The method of claim 1, wherein the notification includes a user interface element configured for accessing the ongoing conference.

4. The method of claim 1, wherein the topic-of-interest is associated with the user based on calendar information of the user.

5. The method of claim 1, wherein the topic-of-interest is associated with the user based on documents obtained from the user.

6. The method of claim 1, further comprising:
receiving, from another participant, an indication to disable a transcription of speech of the another participant;
stopping transcription of the speech of the another participant while the transcription is disabled; and
transmitting the speech of the another participant to other participants while the transcription is disabled.

7. The method of claim 1, further comprising:
receiving a message from the user; and
presenting the message to participants of the ongoing conference without joining the user to the ongoing conference.

8. A device, comprising:
a memory; and
a processor, the processor configured to execute instructions stored in the memory to:
  generate, using a transcription engine accessing audio of an ongoing conference implemented by a conferencing software and including participants, a real-time transcript of a portion of the ongoing conference, wherein to generate the real-time transcript comprises to:
    determine that audio accessed by the transcription engine includes speech from a person who is not a participant of the ongoing conference, wherein the speech from the person is included in audio data associated with one of the participants; and
    in response to determining that the audio accessed by the transcription engine includes the speech from the person who is not a participant of the ongoing conference, prevent the speech from the person from being included in the real-time transcript; and
  responsive to detecting that a topic-of-interest associated with a user who is not a current participant of the ongoing conference is referenced within the real-time transcript:
    present, via the conferencing software, a real-time voting interface to at least some participants of the ongoing conference;
    identify respective votes of at least some of the participants of the ongoing conference, wherein each of the respective votes indicates whether a notification indicative of the topic-of-interest is to be transmitted to the user responsive to detecting that the topic-of-interest is associated with the user, wherein each of the respective votes indicates whether a notification indicative of the topic-of-interest is to be transmitted to the user responsive to detecting that the topic-of-interest is associated with the user, and wherein the respective votes are collected in real-time from the participants of the ongoing conference via the real-time voting interface;
    determine, based on a voting rule, whether the respective votes indicate to transmit the notification; and
    in response to determining that the respective votes indicate to transmit the notification, transmit the notification indicative of the topic-of-interest and the ongoing conference to the user.

9. The device of claim 8, wherein to transmit the notification indicative of the topic-of-interest and the ongoing conference comprises to:
obtain, from another participant, a confirmation to send the notification; and
transmit the confirmation to the user in response to receiving the confirmation.

10. The device of claim 8, wherein to generate the real-time transcript comprises to:
obtain a portion of a speech from a device associated with another participant and connected to the ongoing conference;
identify, in the portion of the speech, the another participant as a first speaker;
identify, in the portion of the speech, at least one second speaker other than the another participant; and
in response to determining that a signal associated with the speech of the another participant has a highest quality amongst the signal associated with the speech of the another participant and an at least one signal associated with the at least one second speaker, generate the real-time transcript based on the speech of the another participant and disregarding the speech of the at least one second speaker.

11. The device of claim 8, wherein the notification includes conference joining details.

12. The device of claim 8, wherein the processor is further configured to execute instructions stored in the memory to:
receive, from another participant, an indication to disable a transcription of speech of the another participant, wherein the indication to disable the transcription is such that while the transcription is disabled, other participants are able to hear the another participant but no transcription is obtained of the speech of the another participant.

13. The device of claim 8, wherein the processor is further configured to execute instructions stored in the memory to:
receive a message from the user; and
present the message to participants of the ongoing conference without joining the user to the ongoing conference.

14. A non-transitory computer readable medium storing instructions operable to cause one or more processors to perform operations comprising:
generating, using a transcription engine accessing audio of an ongoing conference implemented by a conferencing software and including participants, a real-time transcript of a portion of the ongoing conference, wherein generating the real-time transcript comprises:
determining that audio accessed by the transcription engine includes speech from a person who is not a participant of the ongoing conference, wherein the speech from the person is included in audio data associated with one of the participants; and
in response to determining that the audio accessed by the transcription engine includes the speech from the person who is not a participant of the ongoing conference, preventing the speech from the person from being included in the real-time transcript; and
responsive to detecting that a topic-of-interest associated with a user who is not a current participant of the ongoing conference is referenced within the real-time transcript:
presenting, via the conferencing software, a real-time voting interface to at least some participants of the ongoing conference;
identifying respective votes of at least some of the participants of the ongoing conference, wherein each of the respective votes indicates whether a notification indicative of the topic-of-interest is to be transmitted to the user responsive to detecting that the topic-of-interest is associated with the user, wherein each of the respective votes indicates whether a notification indicative of the topic-of-interest is to be transmitted to the user responsive to detecting that the topic-of-interest is associated with the user, and wherein the respective votes are collected in real-time from the participants of the ongoing conference via the real-time voting interface;
determining, based on a voting rule, whether the respective votes indicate to transmit the notification; and
in response to determining that the respective votes indicate to transmit the notification, transmitting the notification indicative of the topic-of-interest and the ongoing conference to the user.

15. The non-transitory computer readable medium of claim 14, wherein the operations further comprise:
receiving from another participant of the ongoing conference a command to send a request to another user to join the ongoing conference; and
sending the request to the another user to join the ongoing conference.

16. The non-transitory computer readable medium of claim 14, wherein the operations further comprise:
receiving from another participant a command to schedule a meeting for a subset of current participants of the ongoing conference, wherein the command includes the subset of the current participants; and
sending a request to a calendaring software to schedule the meeting.

17. The non-transitory computer readable medium of claim 14, wherein the operations further comprise:
receiving, from another participant, an indication to disable transcription of speech of the another participant, wherein the indication to disable a transcription is such that while the transcription is disabled, other participants are able to hear the another participant but no transcription is obtained of the speech of the another participant.

18. The non-transitory computer readable medium of claim 14, wherein the operations further comprise:
receiving a message from the user; and
presenting the message to participants of the ongoing conference without joining the user to the ongoing conference.

19. The non-transitory computer readable medium of claim 14, wherein the operations further comprise:
receiving the respective votes from at least some users that meet joining criteria of the ongoing conference.

20. The non-transitory computer readable medium of claim 14, wherein the operations further comprise:
identifying another user based on the real-time transcript, wherein the another user is not a current participant of the ongoing conference; and
determining whether to send a notification to the another user based on a response received from another participant of the ongoing conference to a prompt to confirm that the notification is to be sent to the another user.

* * * * *